United States Patent
Nykamp

(10) Patent No.: US 10,654,520 B2
(45) Date of Patent: May 19, 2020

(54) METHODS AND APPARATUSES FOR DISTURBANCE AND STABILITY DETECTION BY VEHICLE GUIDANCE SYSTEMS

(71) Applicant: Deere & Company, Moline, IL (US)

(72) Inventor: Alex Nykamp, Urbandale, IA (US)

(73) Assignee: DEERE & COMPANY, Moline, IL (US)

( * ) Notice: Subject to any disclaimer, the term of this patent is extended or adjusted under 35 U.S.C. 154(b) by 75 days.

(21) Appl. No.: 15/252,786

(22) Filed: Aug. 31, 2016

(65) Prior Publication Data

US 2018/0057045 A1    Mar. 1, 2018

(51) Int. Cl.
| | |
|---|---|
| B62D 6/00 | (2006.01) |
| B62D 15/02 | (2006.01) |
| B62D 3/14 | (2006.01) |
| B62D 5/065 | (2006.01) |
| B62D 5/09 | (2006.01) |
| B62D 1/28 | (2006.01) |

(52) U.S. Cl.
CPC .............. *B62D 6/005* (2013.01); *B62D 1/28* (2013.01); *B62D 3/14* (2013.01); *B62D 5/065* (2013.01); *B62D 5/091* (2013.01); *B62D 6/003* (2013.01); *B62D 15/025* (2013.01)

(58) Field of Classification Search
None
See application file for complete search history.

(56) References Cited

U.S. PATENT DOCUMENTS

| | | | |
|---|---|---|---|
| 6,052,647 A | 4/2000 | Parkinson et al. | |
| 6,789,014 B1 | 9/2004 | Rekow et al. | |
| 7,225,060 B2 | 5/2007 | O'Connor et al. | |
| 2003/0230449 A1 | 12/2003 | Nelson et al. | |
| 2005/0288834 A1* | 12/2005 | Heiniger | G05D 1/027 701/23 |
| 2007/0225914 A1* | 9/2007 | Kawazoe | B60W 30/12 701/301 |
| 2007/0256884 A1 | 11/2007 | Rekow et al. | |
| 2011/0140872 A1* | 6/2011 | McClure | B60Q 9/008 340/431 |

(Continued)

FOREIGN PATENT DOCUMENTS

EP    2112042 A1    10/2009

OTHER PUBLICATIONS

Extended European Search Report for European Patent Application No. 17186358.2 dated Jan. 31, 2018.

*Primary Examiner* — Todd M Melton
*Assistant Examiner* — Jason R Roberson
(74) *Attorney, Agent, or Firm* — Harness, Dickey & Pierce, P.L.C.

(57) ABSTRACT

In an example embodiment, a vehicle control system includes a memory including computer-readable instructions stored therein and a processor. The processor configured to execute the computer-readable instructions to receive information corresponding to, a yaw rate of a vehicle, a lateral position of the vehicle and a heading angle of the vehicle, determine a stability indicator indicating an estimate of a stability of the vehicle based on the received information, and adjust one or more gains of a steering system of the vehicle based on the determined stability indicator.

21 Claims, 5 Drawing Sheets

(56) References Cited

U.S. PATENT DOCUMENTS

2011/0178671 A1* 7/2011 Bae .................. G01B 21/26
   701/31.4
2013/0190982 A1* 7/2013 Nakano .................. B62D 6/00
   701/41
2013/0261897 A1   10/2013 Potter et al.

* cited by examiner

METHODS AND APPARATUSES FOR DISTURBANCE AND STABILITY DETECTION BY VEHICLE GUIDANCE SYSTEMS

FIELD

Example embodiments are related to systems and methods for disturbance and stability detection by a vehicle guidance system for guiding a vehicle.

BACKGROUND

A vehicle control system installed on a vehicle (e.g., a heavy duty vehicle such as a tractor, etc.) is typically tuned (various gains of the system are tuned) in order to ensure the stability of the vehicle in worst case conditions. This tuning entails determining a set of conservative gains for the vehicle control system so that the vehicle control system would be over-damped, thus ensuring said stability.

The use of such conservative gains in more ideal conditions (relative to the worst case conditions) results in a sub-optimal performance of the vehicle.

SUMMARY

Some embodiments are directed to methods and apparatuses for disturbance and stability detection by a vehicle guidance system for guiding a vehicle.

In an example embodiment, a vehicle control system includes a memory including computer-readable instructions stored therein and a processor. The processor configured to execute the computer-readable instructions to receive information corresponding to, a yaw rate of a vehicle, a lateral position of the vehicle and a heading angle of the vehicle, determine a stability indicator indicating an estimate of a stability of the vehicle based on the received information, and adjust one or more gains of a steering system of the vehicle based on the determined stability indicator.

In an example embodiment, a method includes receiving information corresponding to, a yaw rate of a vehicle, a lateral position of the vehicle and a heading angle of the vehicle, determining a stability indicator indicating an estimate of a stability of the vehicle based on the received information and adjusting one or more gains of a steering system of the vehicle based on the determined stability indicator.

BRIEF DESCRIPTION OF THE DRAWINGS

Example embodiments will be more clearly understood from the following detailed description taken in conjunction with the accompanying drawings.

FIG. 1 is a block diagram of a vehicle steering system, according to an example embodiment;

FIG. 2 is a block diagram of a vehicle steering system, according to an example embodiment;

FIG. 3 illustrates a method of determining a stability of a vehicle and gain adjustment thereof, according to an example embodiment;

FIG. 4 illustrates a method of determining a value of a stability indicator, according to an example embodiment.

DETAILED DESCRIPTION

Figure 1:
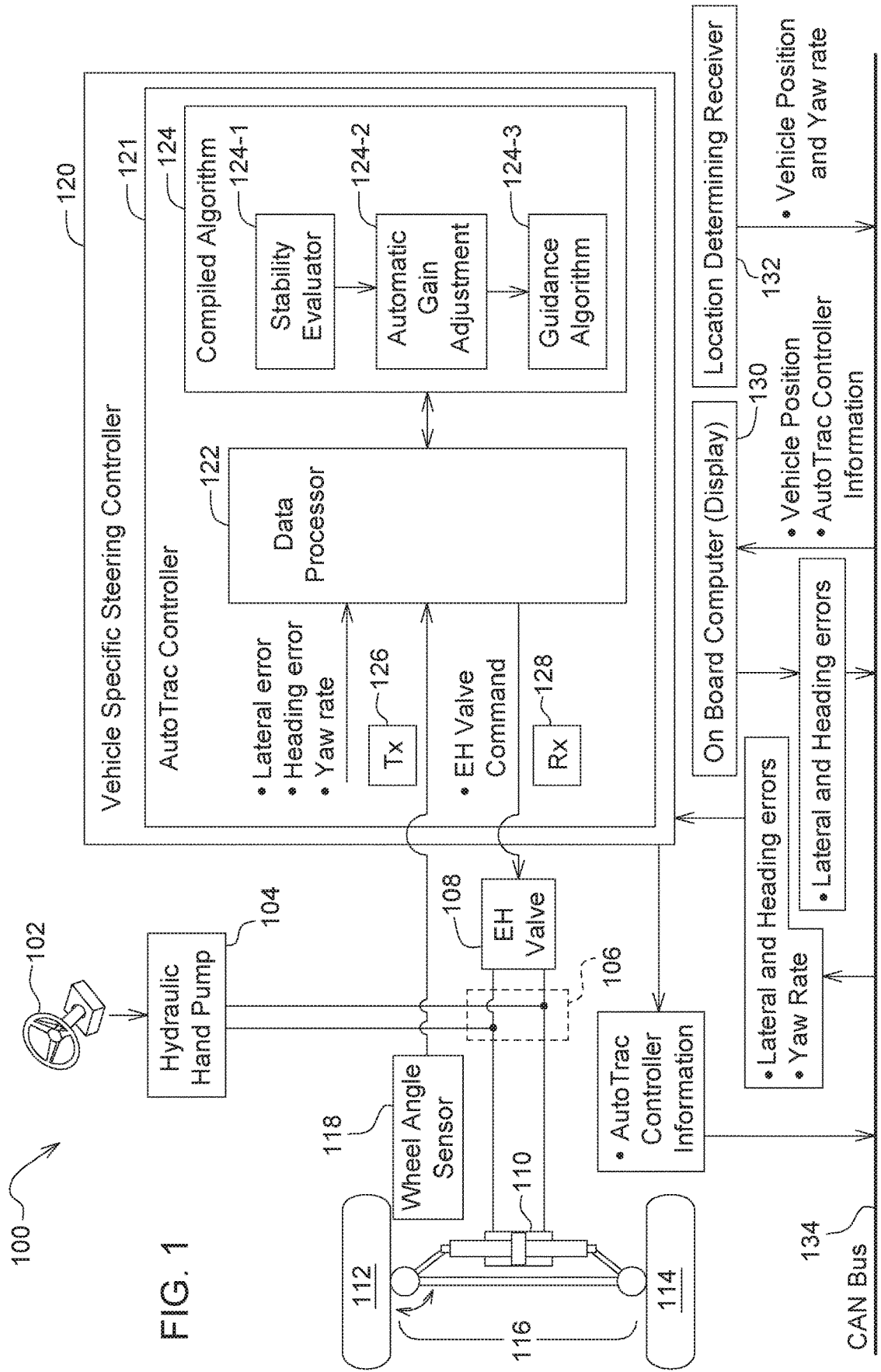
FIGS. 1-4 represent non-limiting, example embodiments as described herein.

Some example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

Some embodiments are directed to methods and apparatuses for disturbance and stability detection by a vehicle guidance system in guiding a vehicle.

In an example embodiment, a vehicle control system includes a memory including computer-readable instructions stored therein and a processor. The processor configured to execute the computer-readable instructions to receive information corresponding to, a yaw rate of a vehicle, a lateral position of the vehicle and a heading angle of the vehicle, determine a stability indicator indicating an estimate of a stability of the vehicle based on the received information, and adjust one or more gains of a steering system of the vehicle based on the determined stability indicator.

In yet another example embodiment, the received information includes an error in the lateral position of the vehicle with respect to a reference line and an error in the heading angle of the vehicle with respect to the reference line.

In yet another example embodiment, wherein the processor is further configured to execute the computer-readable instructions to determine if the yaw rate is greater than a first threshold, determine if the error in the lateral position of the vehicle is greater than a second threshold, determine if the error in the heading angle of the vehicle is greater than a third threshold, and determine the stability indicator based on whether the yaw rate is greater than the first threshold, whether the error in the lateral position of the vehicle is greater than the second threshold, and whether the error in the heading angle of the vehicle is greater than third threshold.

In yet another example embodiment, the processor is further configured to execute the computer-readable instructions to determine the stability indicator to be zero if the processor determines that the yaw rate is greater than the first threshold, or the error in the lateral position of the vehicle is greater than the second threshold, or the error in the heading angle of the vehicle is greater than the third threshold.

In yet another example embodiment, the processor is further configured to execute the computer-readable instructions to determine the stability indicator by updating a previous value of the stability indicator upon the processor determining that the yaw rate is less than the first threshold, and the error in the lateral position of the vehicle is less than the second threshold, and the error in the heading angle of the vehicle is less than the third threshold.

In yet another example embodiment, the processor is further configured to execute the computer-readable instructions to update the previous value of the stability indicator based on a first ratio associated with the yaw rate, a second ratio associated with the error in the lateral position of the vehicle and a third ratio associated with the error in the heading angle of the vehicle.

In yet another example embodiment, wherein the first ratio is a ratio of a difference between the yaw rate and the first threshold to the yaw rate, the second ratio is a ratio of a difference between the error in the lateral position of the vehicle and the second threshold to the error in the lateral position of the vehicle, and the third ratio is a ratio of a difference between the error in the heading angle of the vehicle and the third threshold to the error in the heading angle of the vehicle.

In yet another example embodiment, the processor is further configured to execute the computer-readable instructions to adjust the one or more gains proportional to the determined stability indicator such that when the processor increases a value of the stability indicator, the processor is also configured to increase values of the one or more gains.

In yet another example embodiment, the processor is further configured to execute the computer-readable instructions to receive the information from at least one of an onboard location-determining receiver and an onboard display installed in the vehicle.

In yet another example embodiment, the processor is further configured to execute the computer-readable instructions to transmit guiding commands to a steering shaft of the vehicle based on the adjusted one or more gains.

In an example embodiment, a method includes receiving information corresponding to, a yaw rate of a vehicle, a lateral position of the vehicle and a heading angle of the vehicle, determining a stability indicator indicating an estimate of a stability of the vehicle based on the received information and adjusting one or more gains of a steering system of the vehicle based on the determined stability indicator.

In yet another example embodiment, the received information includes an error in the lateral position of the vehicle with respect to a reference line and an error in the heading angle of the vehicle with respect to the reference line.

In yet another example embodiment, the method further includes determining if the yaw rate is greater than a first threshold, determining if the error in the lateral position of the vehicle is greater than a second threshold, determining if the error in the heading angle of the vehicle is greater than a third threshold, wherein the determining the stability indicator determines the stability indicator based on whether the yaw rate is greater than the first threshold, whether the error in the lateral position of the vehicle is greater than the second threshold, and whether the error in the heading angle of the vehicle is greater than third threshold.

In yet another example embodiment, the determining the stability indicator determines the stability indicator to be zero upon the yaw rate being greater than the first threshold, or the error in the lateral position of the vehicle being greater than the second threshold, or the error in the heading angle of the vehicle being greater than the third threshold.

In yet another example embodiment, the determining the stability indicator includes updating a previous value of the stability indicator upon the yaw rate being less than the first threshold, and the error in the lateral position of the vehicle being less than the second threshold, and the error in the heading angle of the vehicle being less than the third threshold.

In yet another example embodiment, the updating includes updating the previous value of the stability indicator based on a first ratio associated with the yaw rate, a second ratio associated with the error in the lateral position of the vehicle and a third ratio associated with the error in the heading angle of the vehicle.

In yet another example embodiment, the first ratio is a ratio of a difference between the yaw rate and the first threshold to the yaw rate, the second ratio is a ratio of a difference between the error in the lateral position of the vehicle and the second threshold to the error in the lateral position of the vehicle, and the third ratio is a ratio of a difference between the error in the heading angle of the vehicle and the third threshold to the error in the heading angle of the vehicle.

In yet another example embodiment, the adjusting includes adjusting the one or more gains proportional to the determined stability indicator such that when a value of the stability indicator increases, values of the one or more gains also increase.

In yet another example embodiment, the receiving includes receiving the information from at least one of an onboard location-determining receiver and an onboard display installed in the vehicle.

In yet another example embodiment, the method further includes transmitting guiding commands to a steering shaft of the vehicle based on the adjusted one or more gains.

As mentioned in the Background Section, currently a vehicle control system (which hereinafter may also be referred to as a vehicle guidance system) utilizes a set of conservative control gains in order to ensure a stable performance of the vehicle in worst conditions. This approach results in sub-optimal performance of the vehicle in more ideal conditions (where such set of conservative control gains may not be needed for a stable operation of the vehicle).

Accordingly, a real-time estimation of the conditions in which the vehicle is operating may be obtained to adjust the control gains, in real-time, based thereon. This in turn would allow adapting (optimizing) the performance of the vehicle to the conditions in which the vehicle is operating.

Hereinafter, example embodiments will be described according to which a scalar factor will be determined that is indicative of a condition in which the vehicle is operating. The scalar may then be used to adjust control gains of the vehicle in real time in order to ensure a stable operation of the vehicle in such condition.

The vehicle referenced in example embodiments throughout this application includes, but is not limited to, heavy duty and off-road vehicles such as tractors, agricultural vehicles used for harvesting crops, tractor loaders, etc.

FIG. 1 is a block diagram of a vehicle steering system, according to an example embodiment.

A vehicle steering system 100 of a vehicle, shown in FIG. 1, includes a steering wheel 102. In one example embodiment, the steering wheel 102 is coupled in a known manner to a conventional hydraulic hand pump 104. The hydraulic hand pump 104 is hydraulically connected to a hydraulic combiner or "T" unit 106. In one example embodiment, an electro-hydraulic steering valve (E-H valve) 108 is also connected hydraulically to the T unit 106.

In one example embodiment, the hydraulic hand pump 104 and the E-H valve 108 are commercially available. In one example embodiment, the T unit 106 combines the flows from hydraulic hand pump 104 and the E-H valve 108 and supplies the combined flows to a conventional steering cylinder 110, which controls the angle of the wheels 112 and 114 through a conventional steering linkage 116. The wheels 112 and 114 may be front or rear wheels.

As shown in FIG. 1, a wheel angle sensor 118 is coupled to the wheel 112. In one example embodiment, the wheel angle sensor 118 generates a wheel angle signal. In one example embodiment, the wheel angle sensor 118 is a flow meter type sensor, such as described in U.S. Patent Application Publication 2003-0230449, filed on 12 Jun. 2002, the entire content of which is incorporated herein by reference. However, example embodiments are not limited to a flow meter type sensor and may be any other known or to be developed sensor. In one example embodiment, there may be another wheel angle sensor just like the wheel angle sensor 118 attached to the wheel 114 as well. Such wheel angle sensor may function in the same manner as the wheel angle sensor 118 described above. In one example embodiment, the wheel angle sensor may transmit the generated signal(s) to a vehicle control system 120, which will be described below.

The vehicle control system 120 (which may hereinafter be also referred to as the vehicle guidance system 120), may include among other components, an AutoTrac controller 121. In one example embodiment, the AutoTrac controller 121 includes a processor 122, a memory 124, a transmitter 126 and a receiver 128. In one example embodiment, the processor 122, the memory 124, the transmitter 126 and the receiver 128 are connected to each other for exchange of data/information therebetween.

The vehicle control system 120 is installed in the vehicle or alternatively, in a towed implement attached to the vehicle, if the implement is equipped with a location-determining receiver 132, which will be further described below.

The processor 122 may be any known, or to be developed, processor installed in the vehicle control system 120. In one example embodiment, the memory 124 may have, among other instructions, a set of instructions stored thereon, for determining an indicator indicative of a condition in which the vehicle is operating and adjusting control gains of the vehicle steering system 100 to ensure a stable performance of the vehicle in said condition, which will be further described with reference to FIGS. 3 and 4.

In one example embodiment, the set of instructions (program codes/software codes) stored on the memory 124 may be separated/grouped into logical units such as the stability evaluation logic 124-1, the automatic gain adjustment logic 124-2 and the guidance logic 124-3, all of which will be described below.

In one example embodiment, the processor 122 is configured to execute the set of instructions stored on the memory 124 for performing the disturbance and stability detection. Accordingly and by executing the set of instructions, the processor 122 is transformed into a special purpose processor for carrying out the disturbance and stability detection process. The receiver 126 and the transmitter 128 may be any known, or to be developed, receiver and transmitter (or alternatively the receiver 126 and the transmitter 128 may be combined into a single transceiver element), respectively, for communicating with one or more additional components of the vehicle steering system 100 such as the E-H valve 108 or display 130 and/or a location-determining receiver 132 (both of which will be described below).

The display 130 may be any known, or to be developed, display that is installed inside the vehicle's cockpit, through which various types of information may be displayed for a user of the vehicle and/or various type of information may be entered by the user of the vehicle using the display 130.

The location-determining receiver 132 may be any known, or to be developed, receiver capable of providing information on a yaw rate and a yaw angle of the vehicle, a position of the vehicle, a lateral error and a heading angle error associated with the vehicle, etc. The location-determining receiver 132 may be a Global Positioning System Receiver (GPS) with or without differential correction or another satellite navigation receiver.

In one example embodiment, the location-determining receiver 132 provides any one of the following vehicle data, including but not limited to, vehicle's position data, vehicle's velocity data, vehicle's acceleration data, vehicle's yaw angle (e.g., heading), vehicle's tilt angle, vehicle's roll angle and vehicle's yaw rate, where a yaw rate is a rate of change in the yaw angle with respect to time.

In one example embodiment, the lateral error is defined as the difference between a planned path or target path of the vehicle and an actual position of the vehicle as measured by the location-determining receiver 132 at any given time. For example, a target line may be a generally straight line between two designated points (e.g., A-B line established by three dimensional coordinates of the location-determining receiver 132) or substantially parallel thereto, or a curved line that is parallel to an outer boundary of a work area or a field. Accordingly and in one example embodiment, the error in the heading angle is determined based on target heading angle versus the observed heading angle measured by the location-determining receiver 132 at any given time.

The vehicle steering system 100 may further include a control area network (CAN) bus 134 through which various information may be exchanged between the vehicle control system 120 (or the receiver 128), the display 130 and the location-determining receiver 132, as shown in FIG. 1.

Figure 2:
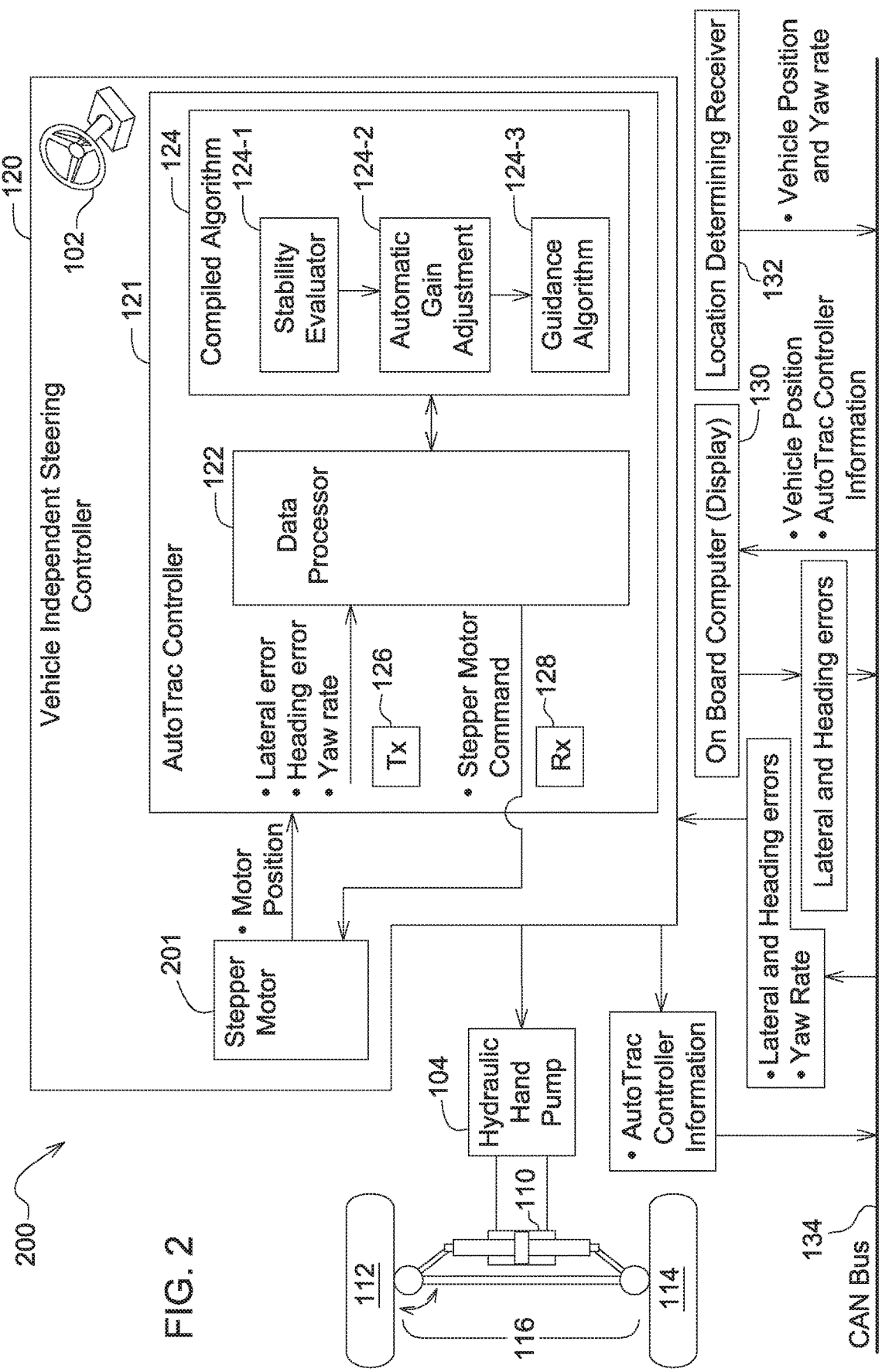

FIG. 2 is a block diagram of a vehicle steering system, according to an example embodiment.

The vehicle steering system 200 shown in FIG. 2 is similar to the vehicle steering system 100 of FIG. 1 in that elements 102, 104, 110, 112, 114, 116, 120, 121, 122, 124, 124-1, 124-2, 124-3, 126, 128, 130, 132 and 134 of the vehicle steering system 200 are the same as their counterpart elements (with the same reference numerals) of the vehicle steering system 100 of FIG. 1. Therefore and for sake of brevity, these elements will not be described in detail with reference to FIG. 2.

The vehicle steering system 200 in FIG. 2 differs from the vehicle steering system 100 of FIG. 1 in that the vehicle steering system 200 does not have a wheel angle sensor and a E-H valve. Instead the vehicle steering system 200 includes a stepper motor 201, which provides appropriate command(s), upon reception of such commands from the processor 122, to the hydraulic hand pump 104 for guiding and driving the vehicle on which the vehicle steering system 200 is installed.

Figure 3:
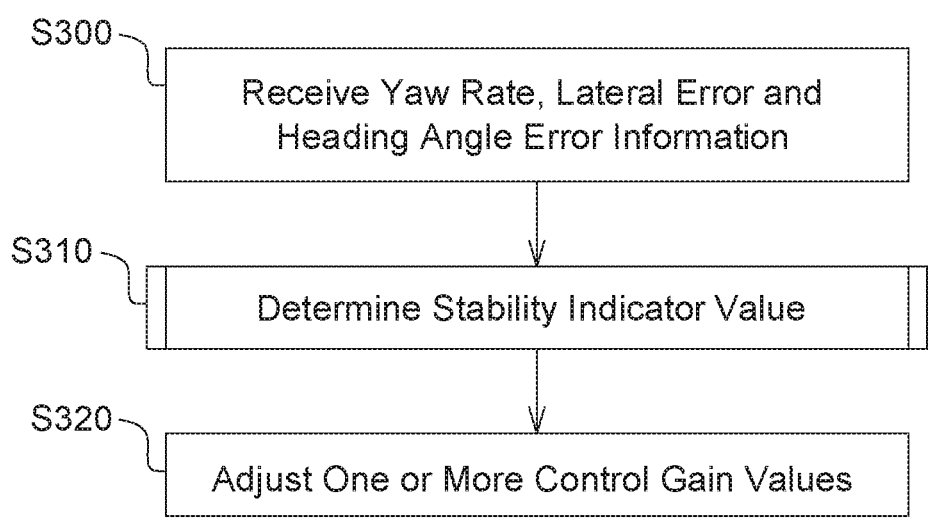

FIG. 3 illustrates a method of determining a stability of a vehicle and gain adjustment thereof, according to an example embodiment. FIG. 3 will be described from the perspective of the vehicle control system 120. However, it will be understood that the vehicle control system 120 performs the following function with the aid of the processor 122 executing corresponding computer-readable instructions stored in the memory 124.

At S300, the vehicle control system 120 receives information regarding conditions in which the vehicle is operating. In one example embodiment, the conditions include a yaw rate of the vehicle, a lateral error of the vehicle and a heading angle error of the vehicle. In one example embodiment, the yaw rate, the lateral error and the heading angle error of the vehicle are determined with respect to a reference line. For example, the reference line may be a straight line parallel to a hypothetical line drawn through the center of the vehicle.

In one example embodiment, the lateral error is determined (as described above) based on a change in a distance between the reference line and the hypothetical line drawing through the center of the vehicle as the vehicle moves parallel to the reference line (e.g. moving closer to or farther from the reference line).

In one example embodiment, the heading angle error is determined (as described above) based on any deviation in the parallel movement of the vehicle parallel along the reference line (e.g. moving towards or away from the reference line).

In one example embodiment, the location-determining receiver 132 obtains information data about the vehicle, as described above (e.g., a position, a heading angle and a yaw rate of the vehicle). The location-determining receiver 132 then transfers the obtained information to the display 130 via the CAN bus 134. In one example embodiment, the location-determining receiver 132 transmits the yaw rate to the vehicle control system 120 via the CAN bus 134.

The display 130 also receives information about the AutoTrac controller 121 via the CAN bus 134. For example, the display 130 receives controller state information. In one example embodiment, there are 4-states and each state is determined by a number of inputs (approximately 25) of various data (e.g., system voltages, status, user inputs). The 4 states are the Installed state, the Ready To Enabled state, the System Enabled state and the Automation state. In one example embodiment, the display 130 also receives controller diagnostic information to help a user or dealership to troubleshoot problems.

Thereafter, the display 130, via an onboard processor of the display 130, determines the lateral and heading angle errors, as described above. For example, in order to determine the lateral and heading angle errors, the display 130 may compare a selected vehicle path (which may have been pre-stored) to the information received from the location-determining receiver 132 with respect to the position and the yaw rate of the vehicle. The display 130 then transmits the lateral error and the heading angle error to the vehicle control system 120 via the CAN bus 134.

Alternatively and as described above, the location-determining receiver 132 determines the lateral and heading angle errors and thereafter provides the same to the display 130.

At S310, the vehicle control system 120 determines a stability indicator that is an estimate of a stability of the vehicle based on the information received at S300. S300 will be further described with reference to FIG. 4.

At S320 and based on the stability factor, the vehicle control system 120 adjusts one or more gains (control gains) of the vehicle steering system 100. Examples of such gains include, but are not limited to, a proportional lateral gain, Proportional-Integral (P-I) gain, etc.

In one example embodiment, an increase or decrease in the one or more control gains is directly proportional to an increase or decrease in the value of the stability indicator. For example, when the value of the stability indicator increases, the one or more control gains will be set higher relative to the value of the one or more gains when the stability indicator has a lower value.

In one example embodiment, the vehicle control system 120 adjusts the one or more gains by referencing a lookup table. In one example embodiment, the gains are proportional or derivative gains on the lateral, heading, and yaw rate. Accordingly, the greater the stability indicator, the higher the gain as defined by such lookup table.

As an example of such lookup table for determining a value of the proportional lateral gain based on the stability indicator value and assuming that the stability indicator is a scalar ranging from 0-2, the lookup table may be given as shown below. In one example embodiment, a linear interpolation may be used to determine the proportional lateral gain value for stability indicator values in between 0, 1 and 2 (e.g., a stability indicator value of 1.5).

| Example Lookup Table | |
| --- | --- |
| Stability Indicator Value | Proportional Lateral Gain |
| 0 | 100 |
| 1 | 120 |
| 2 | 150 |

Figure 4:
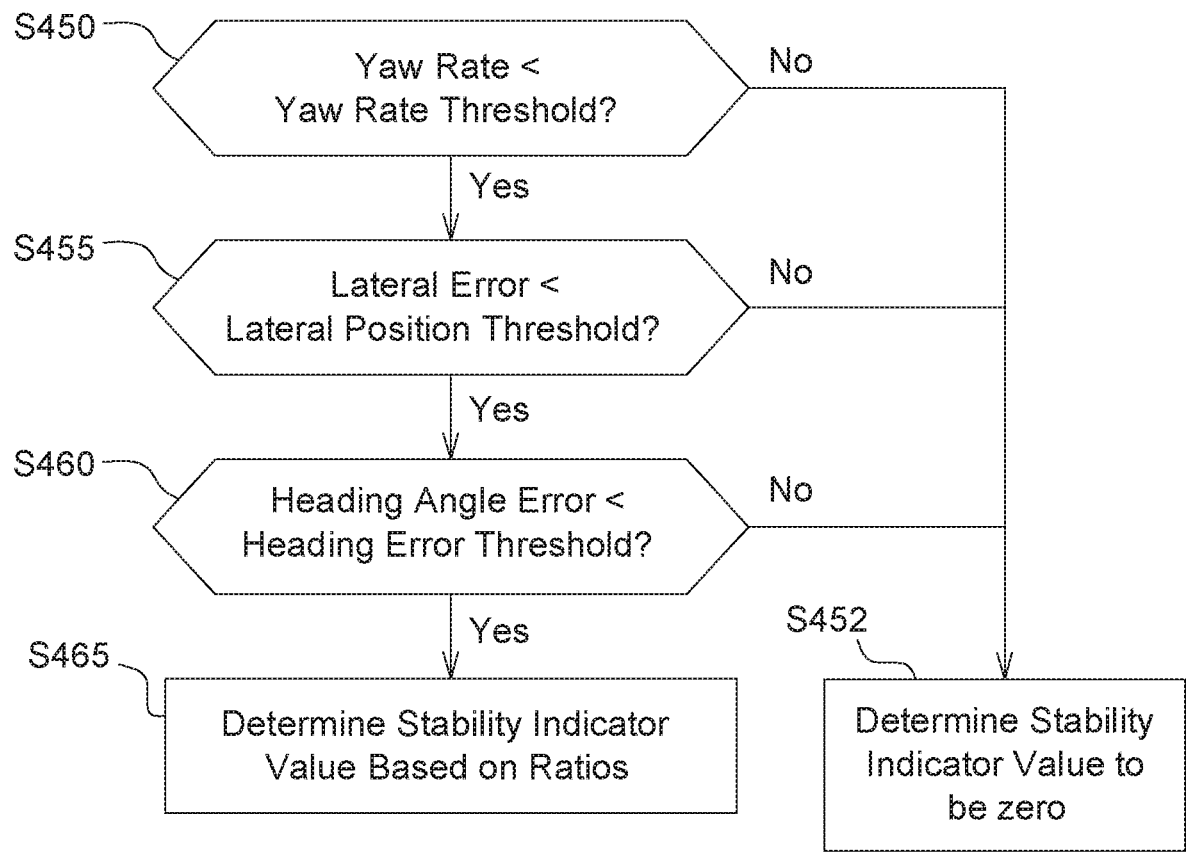

FIG. 4 illustrates a method of determining a value of a stability indicator, according to an example embodiment. FIG. 4 will be described from the perspective of the vehicle control system 120. However, it will be understood that the vehicle control system 120 performs the following function with the aid of the processor 122 executing corresponding computer-readable instructions stored in the memory 124.

At S450, the vehicle control system 120 determines whether the yaw rate received at S300 is less than a yaw rate threshold (first threshold). The yaw rate threshold may be a factory set threshold and determined based on empirical studies. In one example embodiment, the yaw rate threshold is a reconfigurable threshold that may be adjusted by an operator of the vehicle (e.g., via the display 130).

If at S450, the vehicle control system 120 determines that the yaw rate is not less than yaw rate threshold (i.e., the vehicle control system 120 determines that the yaw rate is equal to or greater than the yaw rate threshold), then the vehicle control system 120, at S452, determines the value of the stability indicator to be zero. However, if the vehicle control system 120 determines that the yaw rate is less than the yaw rate threshold, the process proceeds to S455.

At S455, the vehicle control system 120 determines whether the lateral error (error in the lateral position of the vehicle) received at S300 is less than a lateral position threshold (second threshold). The lateral position threshold may also be referred to as the tracking threshold. The lateral position threshold may be a factory set threshold and determined based on empirical studies. In one example embodiment, the lateral position threshold is a reconfigurable threshold that may be adjusted by an operator of the vehicle (e.g., via the display 130).

If at S455, the vehicle control system 120 determines that the lateral error is not less than lateral position threshold (i.e., the vehicle control system 120 determines that the lateral error is equal to or greater than the lateral position threshold), then the process reverts back to S452, where the vehicle control system 120 determines the value of the stability indicator to be zero. However, if the vehicle control system 120 determines that the lateral error is less than the lateral position threshold, the process proceeds to S460.

At S460, the vehicle control system 120 determines whether the heading angle error (error in the heading angle of the vehicle) received at S300 is less than a heading error threshold (third threshold). The heading error threshold may be a factory set threshold and determined based on empirical studies. In one example embodiment, the heading error threshold is a reconfigurable threshold that may be adjusted by an operator of the vehicle (e.g., via the display 130).

If at S460, the vehicle control system 120 determines that the heading angle error is not less than heading error threshold (i.e., the vehicle control system 120 determines that the heading angle is equal to or greater than the heading error threshold), then the process reverts back to S452, where the vehicle control system 120 determines the value of the stability indicator to be zero. However, if the vehicle control system 120 determines that the heading angle error is less than the heading error threshold, the process proceeds to S465.

At S465, the vehicle control system 120 determines a value of a stability indicator (which may also be referred to as a stability scalar). In one example embodiment, the vehicle control system 120 determines the value of the stability indicator, as follows.

The vehicle control system 120 determines three separate ratios, each of which corresponds to one of the yaw rate, the lateral error and the heading angle error. In one example embodiment, a product of the three ratios is the value of the stability indicator.

First, the vehicle control system 120 determines a first ratio, which is a ratio of two values. The first of the two values is a difference between the received yaw rate of the vehicle and the yaw rate threshold. The second value is the yaw rate threshold. Accordingly, the first ratio may be written as:

$$\text{First Ratio} = (\text{yaw rate} - \text{yaw rate threshold})/\text{yaw rate threshold} \quad (1)$$

Second, the vehicle control system 120 determines a second ratio, which is a ratio of two values. The first of the two values is a difference between the received lateral error and the lateral position threshold. The second value is the lateral position threshold. Accordingly, the second ratio may be written as:

$$\text{Second Ratio} = (\text{lateral error} - \text{lateral position threshold})/\text{lateral position threshold} \quad (2)$$

Third, the vehicle control system 120 determines a third ratio, which is a ratio of two values. The first of the two values is a difference between the received heading angle error and the heading error threshold. The second value is the heading error threshold. Accordingly, the second ratio may be written as:

$$\text{Third Ratio} = (\text{heading angle error} - \text{heading error threshold})/\text{heading error threshold} \quad (3)$$

Accordingly, the vehicle control system 120 determines the stability indicator as a product of the first ratio, the second ratio and the third ratio. In one example embodiment, the stability indicator has a value between 0 and 1.

In should be noted that while FIGS. 3 and 4 have been described with respect to three factors, namely the yaw rate, the lateral error and the heading angle error, the determination of the stability indicator is not limited to the need for having all three values and respectively all three ratios described above. In one example embodiment, any combination of one or more of the three factors and the corresponding ratio may be used to determine the value of the stability indicator.

Figure 5:
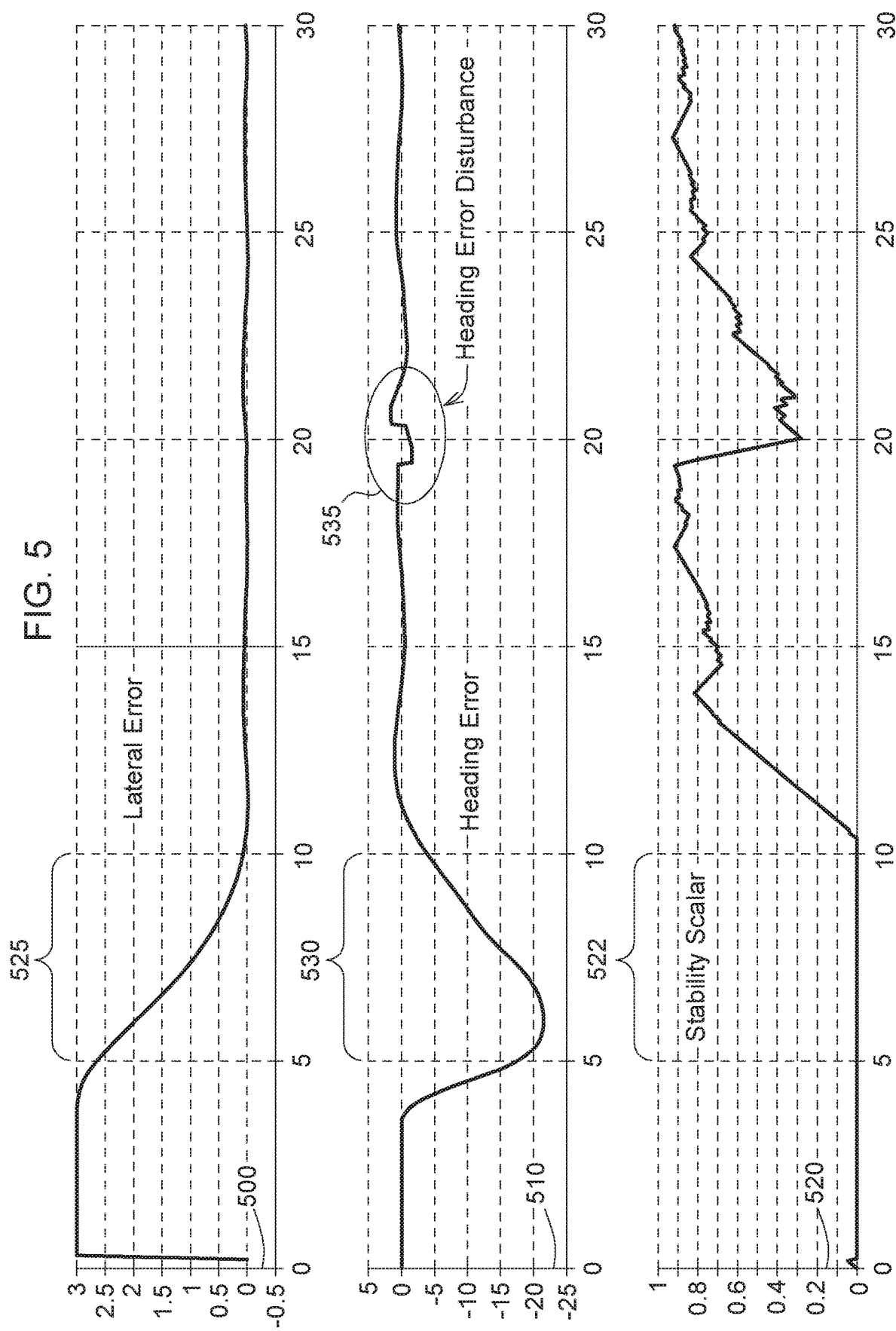
FIG. 5 illustrates a relationship between the lateral error, the heading angle error and the stability indicator value, according to an example embodiment.

FIG. 5 illustrates a relationship between the lateral error, the heading angle error and the stability indicator value, according to an example embodiment.

As shown in FIG. 5, graph 500 illustrates the lateral error, in meters, for a period of 30 seconds, graph 510 illustrates the heading angle error, in degrees, for a period of 30 seconds and graph 520 tracks the stability indicator value for the same 30 seconds period during which the lateral error and the heading angle error are shown.

As shown in graph 520, the stability indicator value is zero for the 5 to 10 seconds period, indicated by reference numeral 522, given the changes in the lateral error and the heading angle error shown in graphs 500 and 510, respectively, for the same first period. For example, graph 500 illustrates a relatively significant change in the lateral error between the 5-10 seconds period indicated by reference numeral 525. This change indicates that the vehicle is getting closer to the reference line, discussed above. Similarly, graph 510 illustrates a relatively significant change in the heading angle error approximately within the same 5-10 seconds indicated by reference numeral 530. This change indicates that the vehicle is heading towards or away from the reference line (depending on which direction is considered positive or negative).

These changes between the 5-10 seconds period translate into the lateral error and the heading angle error being equal to or greater than the lateral position threshold and the heading error threshold, respectively, as determined at S455 and S460 described above. Therefore, as described above with reference to FIG. 4, since the lateral error and the heading angle error are not less than the lateral position threshold and the heading error threshold, respectively, the vehicle control system 120 determines the stability indicator to be zero, as described above with reference to FIG. 3.

However, in the period between 10 to 30 seconds, where the lateral error and the heading angle error stabilize, the stability indicator value takes on non-zero values as shown in graph 520.

Furthermore, FIG. 5 illustrates that at 535 there is a disturbance/change in the heading angle error, which causes the stability indicator value to drop momentarily. However, the stability indicator value increases again as the heading angle error stabilizes.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A vehicle control system configured to control a steering system of a vehicle that includes an on-board display and a location determining receiver, the vehicle control system comprising:
   a controller including
   a transmitter and a receiver configured to communicate with one or more components of the steering system;
   a memory including computer-readable instructions stored therein; and
   one or more processors configured to execute the computer-readable instructions such that the one or more processors are configured to perform operations including,
      receiving, with respect to a planned path that is parallel to a boundary of a work area in which the vehicle is operating, information about, a yaw rate of a vehicle, a lateral position of the vehicle, a heading angle of the vehicle, a lateral error of the vehicle and a heading angle error of the vehicle from the location determining receiver representing conditions in which the vehicle is operating,
      transferring received information from the location determining receiver to the on-board display,
      determining a stability indicator indicating an estimate of stability of the vehicle based on the conditions in which the vehicle is operating and the received information and at least one of a user inputted threshold yaw rate, a user inputted threshold lateral position, and a user inputted threshold heading error, and
      adapting performance of the vehicle by adjusting one or more vehicle control gains of the steering system of the vehicle in real time based on the determined stability indicator.

2. The vehicle control system of claim 1, wherein the one or more processors are further configured to
   determine at least one of the lateral error and the heading angle error by retrieving the planned path from the memory and comparing a selected vehicle path to the information received from the location determining receiver, wherein
      when the received information includes an error in the lateral position of the vehicle with respect to the planned path and an error in the heading angle of the vehicle with respect to a reference line, the processor adjusts one or more of the vehicle control gains.

3. The vehicle control system of claim 2, wherein the one or more processors are further configured to execute the computer-readable instructions to,
  determine if the yaw rate is greater than a first threshold,
  determine if the error in the lateral position of the vehicle is greater than a second threshold,
  determine if the error in the heading angle of the vehicle is greater than a third threshold, and
  determine the stability indicator based on whether the yaw rate is greater than the first threshold, whether the error in the lateral position of the vehicle is greater than the second threshold, and whether the error in the heading angle of the vehicle is greater than third threshold.

4. The vehicle control system of claim 3, wherein the one or more processors are further configured to execute the computer-readable instructions to determine the stability indicator to be zero if the processor determines that,
  the yaw rate is greater than the first threshold, or
  the error in the lateral position of the vehicle is greater than the second threshold, or
  the error in the heading angle of the vehicle is greater than the third threshold.

5. The vehicle control system of claim 3, wherein the one or more processors are further configured to execute the computer-readable instructions to determine the stability indicator by updating a previous value of the stability indicator upon the processor determining that,
  the yaw rate is less than the first threshold, and
  the error in the lateral position of the vehicle is less than the second threshold, and
  the error in the heading angle of the vehicle is less than the third threshold.

6. The vehicle control system of claim 5, wherein the one or more processors are further configured to execute the computer-readable instructions to update the previous value of the stability indicator based on a first ratio associated with the yaw rate, a second ratio associated with the error in the lateral position of the vehicle and a third ratio associated with the error in the heading angle of the vehicle.

7. The vehicle control system of claim 6, wherein
  the first ratio is a ratio of a difference between the yaw rate and the first threshold to the yaw rate,
  the second ratio is a ratio of a difference between the error in the lateral position of the vehicle and the second threshold to the error in the lateral position of the vehicle, and
  the third ratio is a ratio of a difference between the error in the heading angle of the vehicle and the third threshold to the error in the heading angle of the vehicle.

8. The vehicle control system of claim 1, wherein the one or more processors are further configured to execute the computer-readable instructions to adjust the one or more vehicle control gains proportional to the determined stability indicator such that when the one or more processor increases a value of the stability indicator, the one or more processors are also configured to increase values of the one or more gains.

9. The vehicle control system of claim 1, wherein the one or more processors are further configured to execute the computer-readable instructions to receive the information from at least one of an onboard location-determining receiver and the on-board display installed in the vehicle.

10. The vehicle control system of claim 1, wherein the one or more processors are further configured to execute the computer-readable instructions to transmit guiding commands to a steering shaft of the vehicle based on the adjusted one or more vehicle control gains.

11. A method comprising:
  receiving, with respect to a planned path that is parallel to a boundary of a work area in which a vehicle is operating, information corresponding to, a yaw rate of the vehicle, a lateral position of the vehicle, a heading angle of the vehicle, a lateral error of the vehicle and a heading angle error of the vehicle from a location determining receiver representing conditions in which the vehicle is operating;
  transferring received information from the location determining receiver to a display on board the vehicle;
  determining a stability indicator indicating an estimate of a stability of the vehicle based on the conditions in which the vehicle is operating and the received information and at least one of a user inputted threshold yaw rate, a user inputted threshold lateral position, and a user inputted threshold heading error; and
  adapting performance of the vehicle by adjusting one or more vehicle control gains of a steering system of the vehicle in real time based on the determined stability indicator.

12. The method of claim 11, wherein the received information includes an error in the lateral position of the vehicle with respect to the planned path and an error in the heading angle of the vehicle with respect to the planned path.

13. The method of claim 12, further comprising:
  determining if the yaw rate is greater than a first threshold;
  determining if the error in the lateral position of the vehicle is greater than a second threshold, and
  determining if the error in the heading angle of the vehicle is greater than a third threshold, wherein
  the determining the stability indicator determines the stability indicator based on whether the yaw rate is greater than the first threshold, whether the error in the lateral position of the vehicle is greater than the second threshold, and whether the error in the heading angle of the vehicle is greater than third threshold.

14. The method of claim 13, wherein the determining the stability indicator determines the stability indicator to be zero upon,
  the yaw rate being greater than the first threshold, or
  the error in the lateral position of the vehicle being greater than the second threshold, or
  the error in the heading angle of the vehicle being greater than the third threshold.

15. The method of claim 13, wherein the determining the stability indicator includes updating a previous value of the stability indicator upon,
  the yaw rate being less than the first threshold, and
  the error in the lateral position of the vehicle being less than the second threshold, and
  the error in the heading angle of the vehicle being less than the third threshold.

16. The method of claim 15, wherein the updating includes updating the previous value of the stability indicator based on a first ratio associated with the yaw rate, a second ratio associated with the error in the lateral position of the vehicle and a third ratio associated with the error in the heading angle of the vehicle.

17. The method of claim 16, wherein
  the first ratio is a ratio of a difference between the yaw rate and the first threshold to the yaw rate, the second ratio is a ratio of a difference between the error in the lateral position of the vehicle and the second threshold to the error in the lateral position of the vehicle, and the third ratio is a ratio of a difference between the error in the heading angle of the vehicle and the third threshold to the error in the heading angle of the vehicle.

18. The method of claim 11, wherein the adjusting includes adjusting the one or more gains proportional to the determined stability indicator such that when a value of the stability indicator increases, values of the one or more vehicle control gains also increase.

19. The method of claim 11, wherein the receiving includes receiving the information from at least one of an on-board location-determining receiver and the on-board display installed in the vehicle.

20. The method of claim 11, further comprising:

transmitting guiding commands to a steering shaft of the vehicle based on the adjusted one or more vehicle control gains.

21. The vehicle control system of claim 1, wherein the vehicle is a tractor and the work area is a field in which the tractor is operating.

\* \* \* \* \*